Nov. 16, 1943.                L. S. WILLIAMS                2,334,367
                              WEIGHING SCALE
                          Filed July 3, 1941            3 Sheets-Sheet 3
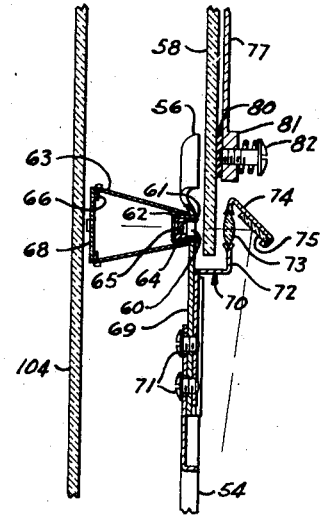
Fig. VII
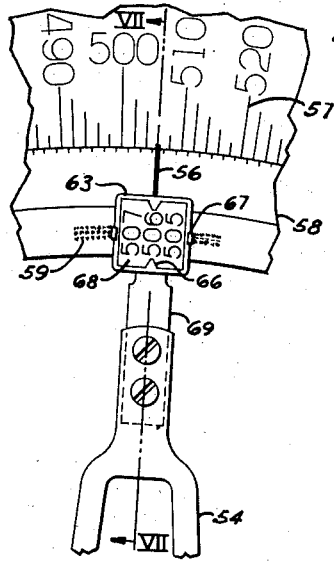
Fig. VI
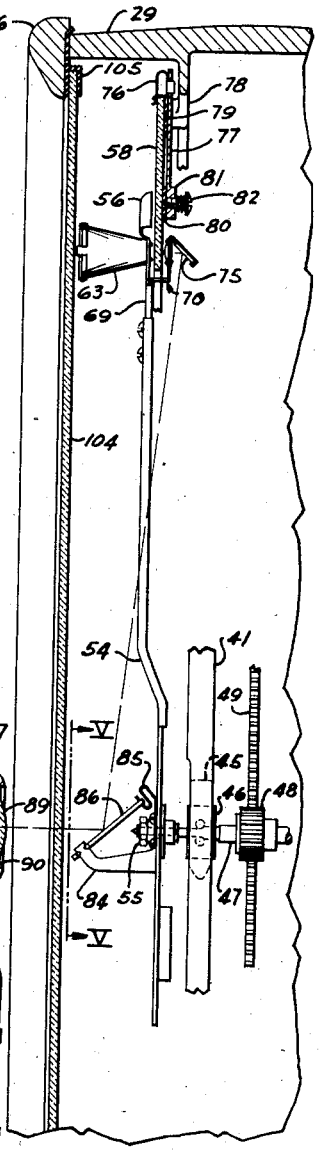
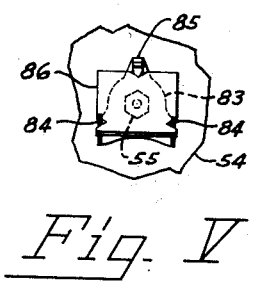
Fig. V
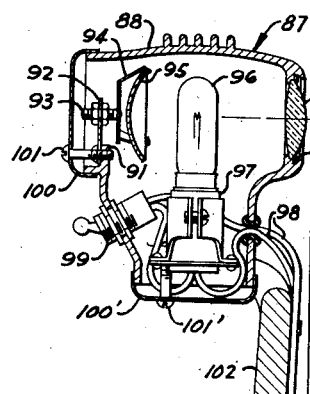
Fig. IV
Lawrence S. Williams
INVENTOR
BY Marshall and Marshall
ATTORNEYS Patented Nov. 16, 1943

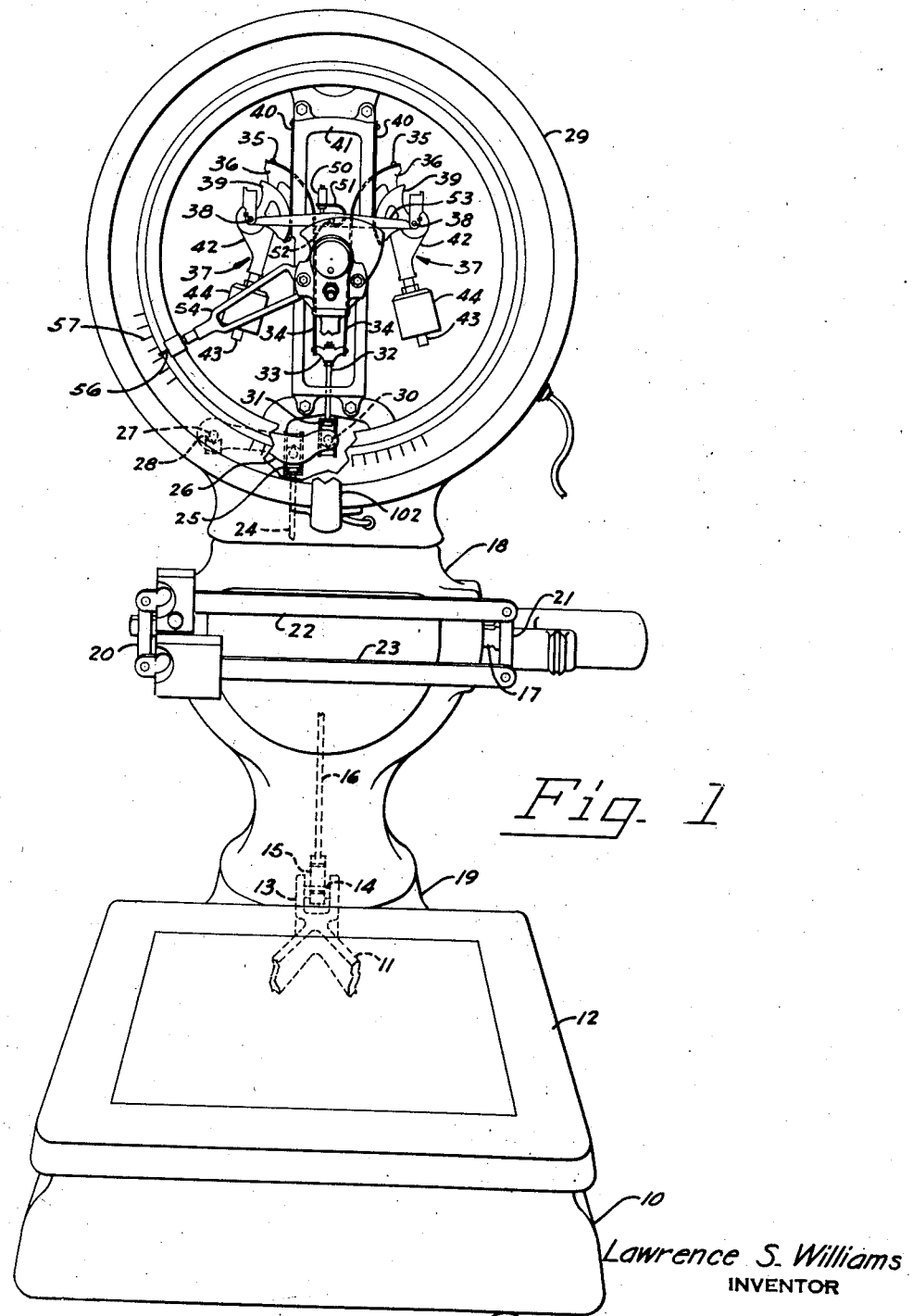

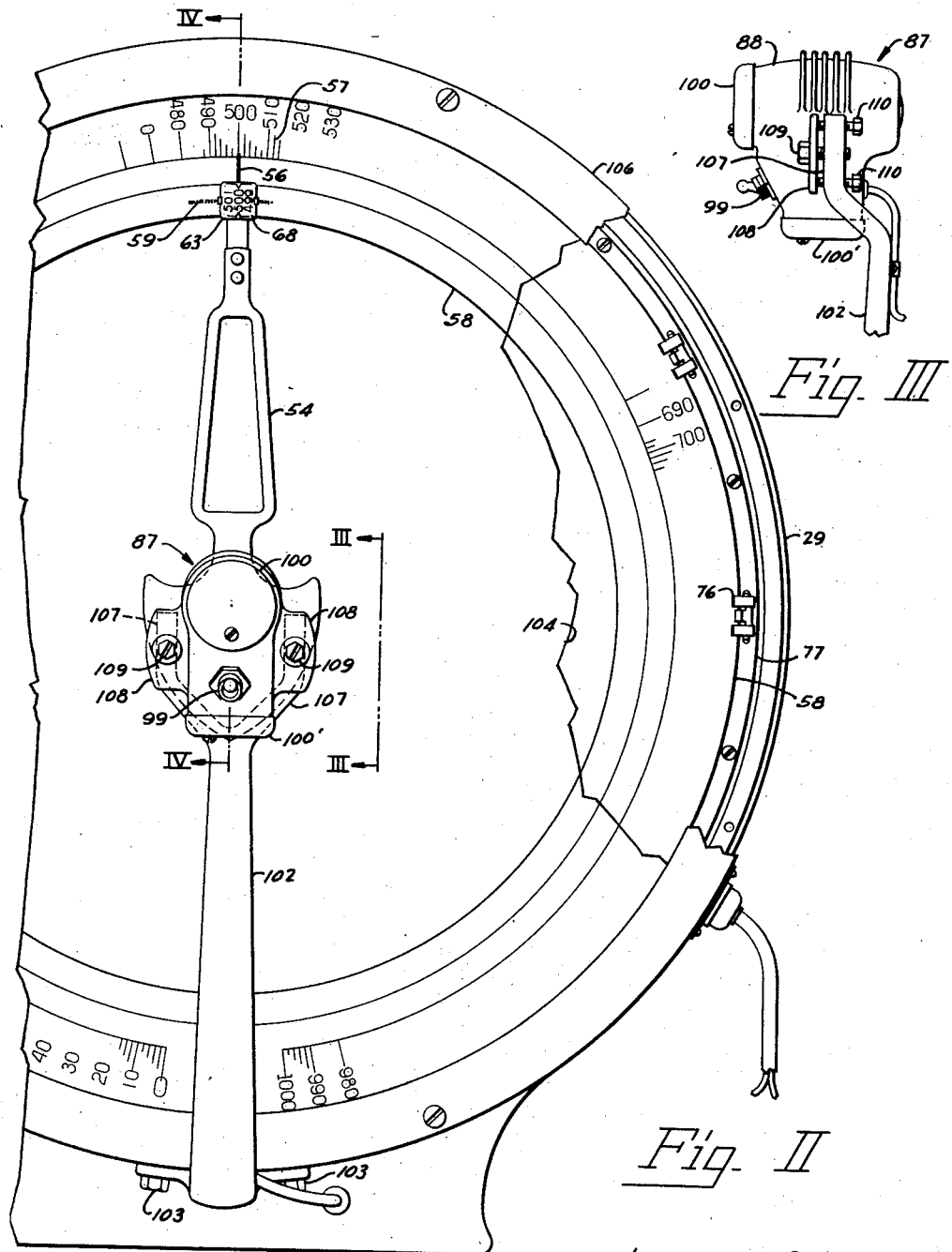

2,334,367

UNITED STATES PATENT OFFICE 2,334,367

WEIGHING SCALE

Lawrence S. Williams, Toledo, Ohio, assignor to Toledo Scale Company, Toledo, Ohio, a corporation of New Jersey Application July 3, 1941, Serial No. 400,955

17 Claims. (Cl. 88—24)

This invention relates generally to weighing scales, and more particularly to scales which are adapted to directly indicate, by means of easily-read projected, magnified figures, the result of a weighing operation.

The value of an automatically indicating scale is in direct proportion to its accuracy in measuring the load and the ability to indicate the weight in a manner that eliminates the possibility of misreading the indication to the greatest extent.

The weighing capacity of a scale of this kind is more or less dependent upon the dimensions of its indicating chart, that is upon the number of graduations and identifying numerals that can be clearly marked thereon. Since these numerals must be of such size so as to be distinguishable from some distance, their number is somewhat limited; therefore, the necessary total weighing capacity is usually obtained by incorporating a number of so-called unit weights in the scale mechanism, each unit weight upon being applied to the weighing mechanism returns the indicator to zero by counterbalancing weight in the amount of the chart capacity. This permits additional load to be weighed. This construction requires that some means be provided for indicating the amount of weight offset by the unit weights that must be added to the chart indication.

A careless operator, or one whose attention is momentarily diverted, may neglect to add this amount to the chart indication or he may make a mistake in addition. Furthermore, the extra mechanism required for the operation and reception of unit weights complicates the scale structure and increases costs.

Accordingly, the principal object of this invention is the provision of an improved scale which is adapted to directly indicate the total weighing capacity.

Another object is the provision of improved means in a scale mechanism which permits automatic indication of its total weighing capacity without increasing the diameter of its indicating chart.

A further object is the provision of improved means for projecting a magnified image of a portion of a weight indicating chart; and, Still another object is the provision of an improved projecting and magnifying mechanism.

Referring to the drawings:

Fig. I is a perspective front elevational view of a scale embodying the invention.

Fig. II is an enlarged fragmentary front elevational view of the indicating housing and showing the indicating means in greater detail.

Fig. III is an enlarged side elevational view of the light projecting means as seen from along the line III—III of Fig. II.

Fig. IV is an enlarged, fragmentary sectional view through the indicating housing and through the associated light projecting means substantially along the line IV—IV of Fig. II.

Fig. V is an enlarged view showing particularly the method of mounting the rotating reflector.

Fig. VI is a still further enlarged fragmentary view of the projecting means and a fragment of the chart; and, Fig. VII is a longitudinal sectional view substantially along the line VII—VII of Fig. VI.

Referring to the drawings in detail:

The scale in which the invention is shown embodied is of a well known type and comprises generally a base 10 which houses a load supporting lever mechanism 11 upon which a load receiving platform 12 is mounted in the usual manner. A nose 13 of the lever mechanism 11, by means of a pivot 14, engages a stirrup 15 on the lower end of a connecting rod 16 whose upper end, which is also provided with a suitable stirrup, pivotally engages an intermediate or tare beam lever 17 which is suitably fulcrumed in an expanded portion of a column 18 that surmounts a deck 19 projecting rearwardly from the base 10.

Brackets 20 and 21, bolted to ends of the beam 17, extend forwardly of the column 18. These serve as supports for tare beams 22 and 23. To transmit torque, the tare beam lever 17 is further provided with a power pivot which is engaged by a stirrup on the lower end of a connecting rod 24 whose upper end, also provided with a stirrup 25, pivotally engages a pendulum lever 26 fulcrumed at 27 on a suitable bearing 28 fixed in the interior of an indicating housing 29 erected upon the column 18. The free end of the lever 26 has a laterally projecting pivot 30 which engages a stirrup 31 on the lower end of a short connecting rod 32. Secured to the upper end of this connecting rod 32 is a crosshead 33, and clamped to the opposite ends of this crosshead are the lower ends of flexible metallic ribbons 34. The upper ends of these ribbons overlie and are clamped as at 35 to arcuate faces of power sectors 36 which form component parts of load counterbalancing pendulums 37.

Each load counterbalancing pendulum comprises a shaft 38 which extends laterally through the power sector 36 and fastened to this shaft are a pair of fulcrum sectors 39, one on each side of the power sector 36. Flexible metallic ribbons 40, whose upper ends are clamped to parallel faces of a pendulum frame 41, overlie the arcuate faces of the fulcrum sectors 39, to whose lower end they are clamped, thus serving to support the pendulums 37. Also mounted on the shafts 38 of the pendulums 37 are depending pendulum bodies 42 into which pendulum stems 43 are studded, and adjustably threaded on these stems are pendulum weights 44 which serve the usual function.

Laterally extending flanges 45 (Fig. IV) of the pendulum frame 41, which is bolted to suitable bosses in the interior of the housing 29, are provided with apertures in which ball bearings 46 are mounted. These ball bearings support the ends of an indicator shaft 47 on which a pinion 48 is fixed. Teeth of this pinion mesh with teeth of a rack 49, the upper end of which is adjustably supported in a rack foot 50, mounted upon a C-shaped flexible member 51 fixed to a bar 52 whose tenoned ends enter apertures in so-called compensating bars 53 whose opposite ends pivotally engage the ends of the pendulum shafts 38.

Since these shafts lie in the center of revolution of the pendulums 37 they partake of their upward movement when a load is placed on the platform and thus the rack 49, operatively connected thereto, is adapted to rotate the indicator shaft 47 and also a light, stamped and formed bifurcated arm 54 which is clamped as at 55 (Fig. IV) to a tenon of the shaft 47 extending beyond the ball bearing 46, through an angle which is proportional to the weight of the load on the platform 12.

The arm 54 serves to support an index member 56 cooperating with a series of graduations 57 and designating numerals of conventional type which are printed on an opaquely coated annular portion of an annulus 58 which is preferably made of transparent glass. An inner concentric annular portion of this annulus is uncoated and transparent, and printed on this transparent portion is a series of micrometric weight figures 59 which extend concentrically to the graduations 57, there being a figure for each graduation. It will be noted that a conventional designating numeral is provided for only each ten graduations. The reason for the provision of the two series of numerals will later become clear.

The index member 56 has an aperture 60 (Fig. VII) which overlies the series 59 of micrometric weight numerals. A shadow-box 63, generally in the form of a frustum of a cone, its small end being enclosed and having an aperture similar to the aperture in the index member, is secured to the member 56 by means of a small tubular bushing-like member 62 (Fig. VII) which has two tabs or tongues 61, projecting from its edge, which pass through aligned slots at the sides of the apertures and are clinched on the opposite face of the index member 56. The outer open end of the conical shadow-box 63, which is made from very thin and light metal, is formed so that it assumes a rectangular shape. The edge of the metal at the rectangular end is bent outwardly and then against itself forming a rim, with the exception of two small triangular portions 66 which are bent inwardly at a substantially right angle. These triangular portions are on opposite sides and their pointed tips are in coincidence with a longitudinal axis and serve as a reading index. Two small tabs 67, one on each of the other sides of the shadow-box, are partially separated from the turned over rim to aid in retaining a translucent screen 68 which is cemented to its rim. This screen may be made from thin ground glass or from a thin plate of light-colored translucent synthetic resin. The small tubular member 62 in the interior of the shadow-box also serves to retain a lens holder 64 which may be turned from any suitable material and in which a small convexo-convex lens 65 is cemented.

A body portion 69 of the index member 56 is formed into a channel and the flanges are then bent inwardly to clamp a straight planar portion of a suitably formed lens holder 70 firmly to the index 56. This assembly is then adjustably fastened to the arm 54 by means of screws 71.

As shown in Fig. VII, a portion 72, which is bent to extend parallelly to the straight clamped portion but in the opposite direction and offset therefrom, is provided with an aperture in which a small condensing lens 73 is seated. A continuing portion 74 of the member 70 is bent backwardly at an angle and serves as a foundation for a small reflecting mirror 75 which is cemented to its inner face.

From Fig. VII it will be seen that the portion of the index member 56 which carries the lens 65 is positioned in front of the indicia bearing transparent portion of the glass annulus 58 and the lens 73 in the portion 72 of the member 70 is in alignment with the lens 65 but on the opposite side of this annulus.

The annulus 58 is held in proper position by a plurality of spring retainers 76 (Fig. IV) which, in spaced relation to each other, are secured to an annulus 77, constructed from metal, and which is fastened to a series of bosses 78 projecting inwardly from the wall of the housing 29. Rubber gaskets 79 and 80 are positioned between the glass annulus 58 and the steel annulus 77. The steel annulus is also provided with a number of bosses 81 which are welded thereto. These bosses are drilled and threaded to receive adjusting screws 82. These screws are provided so that the glass annulus 58 may be adjusted into absolute parallelism with the path of the small projecting lens 65 mounted in the index member 56. The reason for this measure will later become apparent.

Fastened to the arm 54, at its center of revolution, is a substantially triangular member 83 (Figures IV and V) provided with three equally spaced projecting spring arms 84 and 85. The arms 84, near their outer ends, are notched and these notches engage substantially triangular notches in a reflector 86 which is preferably a first surface mirror. The arm 85 is convoluted and provided with notches near its end which engages a suitably positioned notch in the upper side of the reflector 86. The relation of the arms and the notches is such that the reflector 86 is positioned at an angle adapted to reflect a pencil of light, emerging from a light projector 87, to the diagonally positioned mirror 75 carried by the member 70 on the end of the arm 54.

The light projecting means 87 comprises a substantially T-shaped hollow casing 88, the ends of all of the branches being open. In the front opening a condensing lens 89 is mounted and this is retained therein by means of a split spring ring 90. In the rear opening an inwardly projecting boss 91 serves as an anchorage for a plate 92 and it in turn forms a support for a threaded stem 93 which is locked thereto by means of nuts. A tripod-like spring clip 94 is riveted to the inner end of the stem 93 and this holds a small concave, polished reflector 95 which is positioned immediately in back of a concentrated filament of an electric lamp 96 mounted in a socket 97 fixed in the bottom opening of the casing 88. The position of this socket is determined so that the aforementioned concentrated filament of the lamp is positioned in a plane passing horizontally through the center of the lens 89 and that of the reflector 95. A toggle switch 99, clamped in the wall of the casing 88, is adapted to open and close a circuit 98 which connects the lamp 96 with a current supply. Covers 100 and 100' are provided for the rear and bottom openings respectively and are held in position by screws 101 and 101'.

Since this light projecting means must be accurately and rigidly positioned a bracket 102 is rigidly fixed by means of bolts 103 to the lower portion of the housing 29. The upper end of this bracket is bifurcated forming arms 107 (Figures II and III). The casing 88 of the light source 87 is provided with two laterally projecting ears 108 penetrated by bolts 109 which are threaded into the arms 107. Each of these arms is also provided with two holes (Fig. III), one on each side of the hole which receives the bolt 109 and the ends of bolts 110, threaded through these holes, engage the inner faces of the ears 108 of the casing 88. By adjusting the bolts 109 and 110 in the well known manner the optical axis of the light projector 87 may be positioned so that a pencil of light emerging therefrom will impinge upon the reflector 86 in its axis of rotation.

To prevent dust and moisture from entering the housing 29, a circular sheet of glass 104 is retained by means of a channeled rubber gasket 105 and a scroll 106 to the housing 29.

The operation of the weighing scale described herein is well known and requires no detailed description.

The application of a load on the platform 12, through the mechanism described, causes the pendulums 37 to move and counterbalance the moment occasioned by this load in the well known manner. The rack 49, which moves with the pendulums in cooperation with the pinion 48, rotates the shaft 47 to which the arm 54 is clamped and its index 56 then points to the corresponding weight graduation in the series 57 on the opaque portion of the annulus 58. The graduations may represent pounds or multiples thereof. In the embodiment illustrated, each graduation of the series of graduations 57 represents one pound, resulting in a weighing capacity of 1000 pounds since 1000 graduations are approximately the limit which may be provided on a chart of reasonable diameter. Since, as already stated, it is only possible in scales of this type and capacity to provide an identifying figure for each ten graduations, the operator of the scale in obtaining the weight must count the graduations between the last numeral and the position of the indicator in order to obtain the indication accurately. This time consuming operation is obviated in the embodiment of this invention since the numerals in the series 59 on the light permeable portion of the annulus 58 are so small that a numeral can be provided for each graduation.

When placing the scale in operation the operator turns the switch 99 and a pencil of light emanating from the filament of the lamp 96 passes through the condenser lens 89 and impinges upon the reflector 86. At this point it is bent upwardly (as shown in Fig. IV) to strike the reflector 75 which deflects it to pass through the lens 73, which is stationed in front of this mirror, and focuses it on the series of micrometric numerals 59 on the glass annulus and a magnified image thereof is projected, by the small lens 65 in the interior of the shadow-box, against the translucent screen 68 of this member, the numeral corresponding to the weight of the load being indicated by the shadow of the triangular sections 66.

The construction herein disclosed however has another advantage over the conventional type of indication. Scales of this kind to a great extent are used in warehouses, and in more or less out of the way corners of factories and other commercial concerns where the illumination leaves much to be desired and it is customary to provide an electric lamp closely adjacent the scale to illuminate the chart. This results in undesired reflections from the front housing glass 104 and requires that the operator of the scale always assume a position in which the reflection is least objectionable. It should be obvious that a scale according to the present invention may be placed in a poorly lighted room. No extra external light is required since the indication on the screen is luminous and is, therefore, clearly visible even in total darkness; furthermore, in a poorly illuminated position it may be necessary for the operator to pause and search for the indicator, since it revolves through an angle of approximately 360° and is not located in the same position unless the loads weigh the same. This objectionable feature is also eliminated since the brightly illuminated screen immediately locates the position of the indicator.

The embodiments of the invention herein shown and described are to be regarded as illustrative only, and it is to be understood that the invention is susceptible to variation, modification and change within the spirit and scope of the subjoined claims.

Having described the invention, I claim:

1. In a weighing scale, in combination, load receiving means, load counterbalancing mechanism operatively connected thereto, load indicating means actuated by said load counterbalancing mechanism, a casing for housing said load counterbalancing mechanism and said load indicating means, said load indicating means including an annular chart having concentric, opaque and light permeable areas, a series of opaque weight characters marked on such light permeable area, an indicator shaft mounted with its longitudinal axis in coincidence with an axis passing through the center of such concentric areas of said chart, an indicator secured on said shaft, said indicator having a longitudinally extending opening, a reflector mounted diagonally on said indicator and in the axis passing through the center of such concentric areas of said chart, a second reflector mounted diagonally, adjacent the free end of said indicator and back of such light permeable area of said chart, optical lenses and a translucent screen mounted on said indicator adjacent said second reflector, said casing having a glazed window for displaying said chart and said indicator, and a light source having optical means for directing a pencil of light through said glazed window to said first mentioned diagonally mounted reflector; said first mentioned diagonally mounted reflected directly such pencil of light to said second reflector, through such opening in said indicator, and said second reflector directing such pencil of light through said optical lenses, said light permeable area, to project a magnified image of at least one of said opaque weight characters marked on such light permeable area of said chart onto said translucent screen.

2. In a weighing scale, in combination, load receiving means, load counterbalancing mechanism operatively connected thereto, load indicating means actuated by said load counterbalancing mechanism, a casing for housing said load counterbalancing mechanism and said load indicating means, said load indicating means including an annular chart having concentric, opaque and light permeable areas, a series of opaque weight characters marked on such light permeable area, an indicator, optical image projecting means and a screen mounted on said indicator, said indicator being rotatably mounted so that said optical image projecting means and said screen are adapted to traverse said series of opaque weight characters marked on such light permeable area of said chart, said optical image projecting means including a pair of spaced reflectors mounted diagonally to the longitudinal axis of said indicator, said casing having a glazed window, means for projecting a pencil of light mounted exteriorly of said casing for directing such pencil of light to said image projecting means on said indicator, said means for projecting such pencil of light comprising a substantially enclosed casing, a condensing lens mounted in an opening in one end of said casing, a reflector mounted in the opposite end of said casing, an electric light source stationed between said condensing lens and said reflector, and said casing of said means for projecting light having a plurality of extending fins for dissipating heat generated by said electric light source.

3. In a weighing scale, in combination, load receiving means, load counterbalancing mechanism operatively connected thereto and load indicating means actuated thereby, said load indicating means comprising a pivotally mounted indicator, means for rotating said indicator in response to movement of said load counterbalancing mechanism, a chart having concentric, opaque and light permeable areas, a series of weight indicating graduations marked on such opaque area for cooperation with said indicator, a series of complementary opaque weight designating numerals marked on such light permeable area, a casing having a glazed window for housing said load counterbalancing mechanism and said indicating means, a bracket secured to and extending exteriorly of said casing, a light source and optical means for concentrating and directing a pencil of light into the interior of said casing mounted on said bracket, a reflector mounted on said indicator for rotation therewith and in the axis of such pencil of light, a second reflector mounted on said indicator to receive such pencil of light reflected by said first reflector and to reflect such pencil of light through such light permeable area of said chart, and a projecting lens and a screen carried by said indicator to display a magnified image of at least one of said opaque weight designating numerals marked on such light permeable area of said chart.

4. In a device of the class described, in combination, weighing mechanism comprising load counterbalancing mechanism and load indicating means actuated thereby, said load indicating means including an indicator adapted to rotate about a fixed axis, a chart having a light permeable area positioned adjacent and back of said indicator, a series of opaque weight characters marked on such light permeable area of said chart, a reflector secured to said indicator and positioned diagonally to its longitudinal axis, and in its axis of rotation, a second reflector mounted on said indicator and positioned in back of such light permeable area of such chart, a translucent screen mounted on said indicator, a source of light, and a lens system carried by said indicator for cooperation with said source of light and said reflectors for projecting magnified images of said opaque weight characters marked on such light permeable area onto said screen.

5. In a device of the class described, in combination, weighing mechanism including an annular chart, said chart having concentric, opaque and transparent areas, a series of weight graduations marked on such opaque area, a series of complementary weight designating numerals marked on such transparent area, a rotatably mounted indicator adapted to be rotated by said weighing mechanism through an angle proportional to the weight of a load on said weighing mechanism, said indicator having an index adapted to register with that weight graduation of said series of weight graduations on such opaque area corresponding to the weight of such load, a light source, and optical means and a screen carried by said rotatable indicator for displaying a magnified image of that weight designating numeral of said series on such transparent area corresponding to the weight of such load.

6. In a device of the class described, in combination, a casing, weighing mechanism including load counterbalancing mechanism and load indicating means positioned within said casing, said casing having a glazed window adapted to expose to view portions of said load counterbalancing mechanism and said indicating means, said indicating means including a light permeable chart bearing a series of opaque indicia, a pivoted indicator actuated by said load counterbalancing mechanism and movable over such indicia on said chart, a projecting lens, a translucent screen, optical projecting means and reflectors mounted on said indicator, a light source, and means for projecting light secured to the exterior of said housing and adapted to direct such light through such glazed window to said reflectors and optical projecting means on said indicator for projecting images of such opaque indicia on said light permeable chart onto said screen, said screen being visible through such glazed window.

7. In a device of the class described, in combination, a member rotatable in response to change in magnitude of a condition under measurement, a transparent annulus mounted in the rear of said rotatable member, a series of weight indicia marked concentrically on said transparent annulus, a "shadow-box" secured to said rotatable member, said "shadow-box" carrying a projecting lens adjacent said transparent annulus and a translucent screen in spaced relation to said projecting lens, means secured to said rotatable member and positioned back of transparent annulus for directing light through said transparent annulus to cooperate with said projecting lens to project a magnified image of at least one indicium of said series of weight indicia on said transparent annulus onto said screen and a member within said "shadow-box" positioned between said projecting lens and said translucent screen whereby such directed light passing through said transparent annulus is intercepted and the shadow cast by said member serves as an index.

8. In a device of the class described, in combination, a member rotatable in response to change in magnitude of a condition under measurement, a transparent annulus mounted in the rear of said rotatable member, a series of weight indicia marked concentrically on said transparent annulus, a "shadow-box" secured to said rotatable member, said "shadow-box" carrying a projecting lens adjacent said transparent annulus and a translucent screen in spaced relation to said projecting lens, and means secured to said rotatable member and positioned back of said transparent annulus for directing light through said transparent annulus to cooperate with said projecting lens to project a magnified image of at least one indicium of said series of said weight indicia on said transparent annulus onto said screen.

9. In a device of the class described, in combination, load receiving means, a load counterbalance operatively connected thereto and movable in response to a load on said load receiving means, load indicating means actuated in response to movement of said load counterbalance, said load indicating means including an antifrictionally mounted rotatable shaft, an indicator secured to said shaft to partake of its rotation, a pinion on said shaft, a rack secured to said load counterbalance and meshing with said pinion, a chart bearing a series of radially extending weight graduations concentric to said antifrictionally mounted shaft and a series of weight designating numerals, the size of said numerals being of an order of magnitude such as to be unreadable from the distance normally occupied by the operator of the device, and optical means including a screen secured to said indicator whereby magnified images of said weight designating numerals are projected onto said screen, such images being of an order of magnitude readable by such operator when occupying such normal position.

10. In a device of the class described, in combination, a member rotatable in response to change in magnitude of a condition under measurement, a stationary transparent member, a plurality of opaque characters marked on said transparent member, a screen carried by said rotatable member, a fixedly positioned source of light and means carried by said rotatable member for directing light emanating from said source to project a magnified image of at least one of said opaque characters onto said screen.

11. In a device of the class described, in combination, a member rotatable in response to change in magnitude of a condition under measurement, a plane transparent member, a plurality of indicia marked on said transparent member, a source of light, a screen on said rotatable member, and optical means carried by said rotatable member for projecting the image of at least one indicium of said plurality of indicia on said transparent member onto said screen.

12. In a weighing scale, in combination, weighing mechanism, an annular chart, a series of radially spaced indicia on said chart, a member pivoted in the center of area of said annular chart adapted to be rotated through an angle of 360°, means for rotating said rotatable member in response to a load on said weighing mechanism, said rotatable member carrying a translucent screen, and means for successively projecting images of different portions of said series of indicia on said annular chart onto said screen.

13. In a weighing scale, in combination, weighing mechanism, a chart, a series of spaced weight indicia on said chart, a series of weight designating numerals on said chart, an indicator actuated by said weighing mechanism adapted to register with that indicium of said series of spaced indicia on said chart corresponding to the weight of a load on said weighing mechanism, a screen mounted on said indicator and optical means mounted on said indicator for projecting a magnified image of that weight numeral on said chart corresponding to that spaced weight indicium with which said indicator is in registry.

14. In a weighing scale, in combination, weighing mechanism including an annular chart, a pivoted member adapted to be rotated in response to a load on said weighing mechanism, a translucent screen fixed on said rotatable member, said translucent screen overlying a portion of said chart and spaced therefrom, and means for projecting a magnified image of such portion of said chart onto said screen.

15. In a condition measuring device, in combination, a condition responsive element, a screen carried by said condition responsive element, a stationary transparent indicia-bearing chart, a light source and projection means carried by said condition responsive element for projecting an image of that one of said indicia representing the magnitude of the condition under measurement onto said screen.

16. In a condition measuring device, in combination, an element responsive to changes in magnitude of a condition under measurement, an opaque chart bearing indicia, a transparent chart bearing corresponding indicia, projecting means borne by said element for projecting an image of that one of said indicia on said transparent chart corresponding to the value of a condition under measurement, and a screen and a pointer on said element for simultaneously receiving such image and designating that one of said indicia on said opaque chart corresponding thereto.

17. In a device of the class described, in combination, means responsive to change in magnitude of a condition under measurement including a member bearing a projecting lens and a translucent screen, said member being adapted for rotation in a plane, a housing, a transparent indicia-bearing chart mounted in said housing adjacent to the plane of rotation of said member, means for projecting an image of that one of such indicia on said transparent chart indicative of the magnitude of such condition under measurement onto said screen, and means for adjusting said transparent indicia-bearing chart into substantial parallelism with the plane of rotation of said member.

LAWRENCE S. WILLIAMS.

2,334,367

CERTIFICATE OF CORRECTION.

Patent No. 2,334,367.   November 16, 1943.

LAWRENCE S. WILLIAMS.

It is hereby certified that error appears in the printed specification of the above numbered patent requiring correction as follows: Page 3, second column, line 72, claim 1, for "reflected directly" read --reflector directing--; and that the said Letters Patent should be read with this correction therein that the same may conform to the record of the case in the Patent Office.

Signed and sealed this 18th day of April, A. D. 1944.

Leslie Frazer (Seal)                    Acting Commissioner of Patents.